United States Patent
Furuta

(10) Patent No.: US 10,164,680 B2
(45) Date of Patent: Dec. 25, 2018

(54) RADIO COMMUNICATION DEVICE

(71) Applicant: JVC KENWOOD CORPORATION, Yokohama-shi, Kanagawa (JP)

(72) Inventor: Hiroshi Furuta, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 0 days.

(21) Appl. No.: 15/939,990

(22) Filed: Mar. 29, 2018

(65) Prior Publication Data
US 2018/0294835 A1    Oct. 11, 2018

(30) Foreign Application Priority Data

Apr. 11, 2017  (JP) ................. 2017-077938

(51) Int. Cl.
| H04B 1/46 | (2006.01) |
|---|---|
| H04B 1/44 | (2006.01) |
| H04W 4/10 | (2009.01) |
| H04B 1/48 | (2006.01) |
| H04L 5/16 | (2006.01) |

(52) U.S. Cl.
CPC ................. H04B 1/46 (2013.01); H04B 1/48 (2013.01); H04L 5/16 (2013.01); H04W 4/10 (2013.01)

(58) Field of Classification Search
CPC ..... H04W 4/10; H04W 76/45; H04M 1/6066; H04R 2430/01; H04B 1/44; H04B 1/46
See application file for complete search history.

(56) References Cited

U.S. PATENT DOCUMENTS

| 4,082,919 A * | 4/1978 | Day | H04B 1/46 455/528 |
|---|---|---|---|
| 5,230,089 A * | 7/1993 | Kindinger | H04B 1/46 455/84 |
| 7,107,209 B2 * | 9/2006 | Tabata | A42B 3/303 381/104 |
| 7,881,483 B2 * | 2/2011 | Masuda | H04B 3/20 379/406.08 |
| 9,161,181 B2 * | 10/2015 | Tada | H04W 4/10 |

FOREIGN PATENT DOCUMENTS

JP          H7-321693 A          12/1995

* cited by examiner

*Primary Examiner* — Quochien B Vuong
(74) *Attorney, Agent, or Firm* — Nath, Goldberg & Meyer; Jerald L. Meyer

(57) ABSTRACT

A radio communication device is provided with a VOX function. A reception completion state determination unit determines whether or not a reception unit is in a state of completing reception. A timer starts to measure a predetermined time when the reception completion state determination unit determines that the reception unit is in the state of completing the reception. A VOX level selection unit sets a VOX level at which the VOX function determines that transmission is made to a first VOX level after the timer finishes measuring the predetermined time, and sets the VOX level to a second VOX level smaller than the first VOX level while the timer is measuring the predetermined time.

4 Claims, 4 Drawing Sheets

RADIO COMMUNICATION DEVICE

CROSS REFERENCE TO RELATED APPLICATION

This application is based upon and claims the benefit of priority under 35U.S.C.§ 119 from Japanese Patent Application No. 2017-077938, filed on Apr. 11, 2017, the entire contents of which are incorporated herein by reference.

BACKGROUND

The present disclosure relates to a radio communication device provided with a Voice-operated Transmit (VOX) function.

In a radio communication device that adopts a half-duplex communication method, the radio communication device is switched to a transmission state by pressing a Push To Talk (PTT) switch, and the radio communication device is switched to a standby state for reception by releasing the pressing of the PTT switch.

In addition, in order to achieve a hands-free call, the radio communication device may sometimes be provided with a so-called VOX function to switch the radio communication device to the transmission state when a microphone collects a voice of a predetermined level or more (see Japanese Unexamined Patent Application Publication No. 07-321693 (published in 1995)).

SUMMARY

In the radio communication device provided with the VOX function, the microphone must collect such a voice of a predetermined level or more in order to activate the VOX function. Accordingly, a user has needed to talk while being conscious of the level of the voice, at which the VOX function is activated. For example, the user has needed to be conscious of starting a call intentionally at a high volume at the time of wishing to start transmission.

Moreover, it takes a predetermined time for the radio communication device to start transmitting the voice with the VOX function being activated. Accordingly, recording latency may sometimes occur in which the beginning of the call cannot be transmitted.

Accordingly, a radio communication device is desired to appear, which is capable of naturally making a call without being conscious of the level of the voice at the time of starting the call like a cellular phone that adopts a full-duplex communication method, and is capable of minimizing the recording latency.

An aspect of one or more embodiments provides a radio communication device provided with a VOX function, including: a reception completion state determination unit configured to determine whether or not a reception unit of the radio communication device is in a state of completing reception; a timer configured to start to measure a predetermined time when the reception completion state determination unit determines that the reception unit is in the state of completing the reception; and a VOX level selection unit configured to set a VOX level at which the VOX function determines that transmission is made to a first VOX level after the timer finishes measuring the predetermined time, and to set the VOX level to a second VOX level smaller than the first VOX level while the timer is measuring the predetermined time.

DETAILED DESCRIPTION

Embodiment 1

Figure 1:
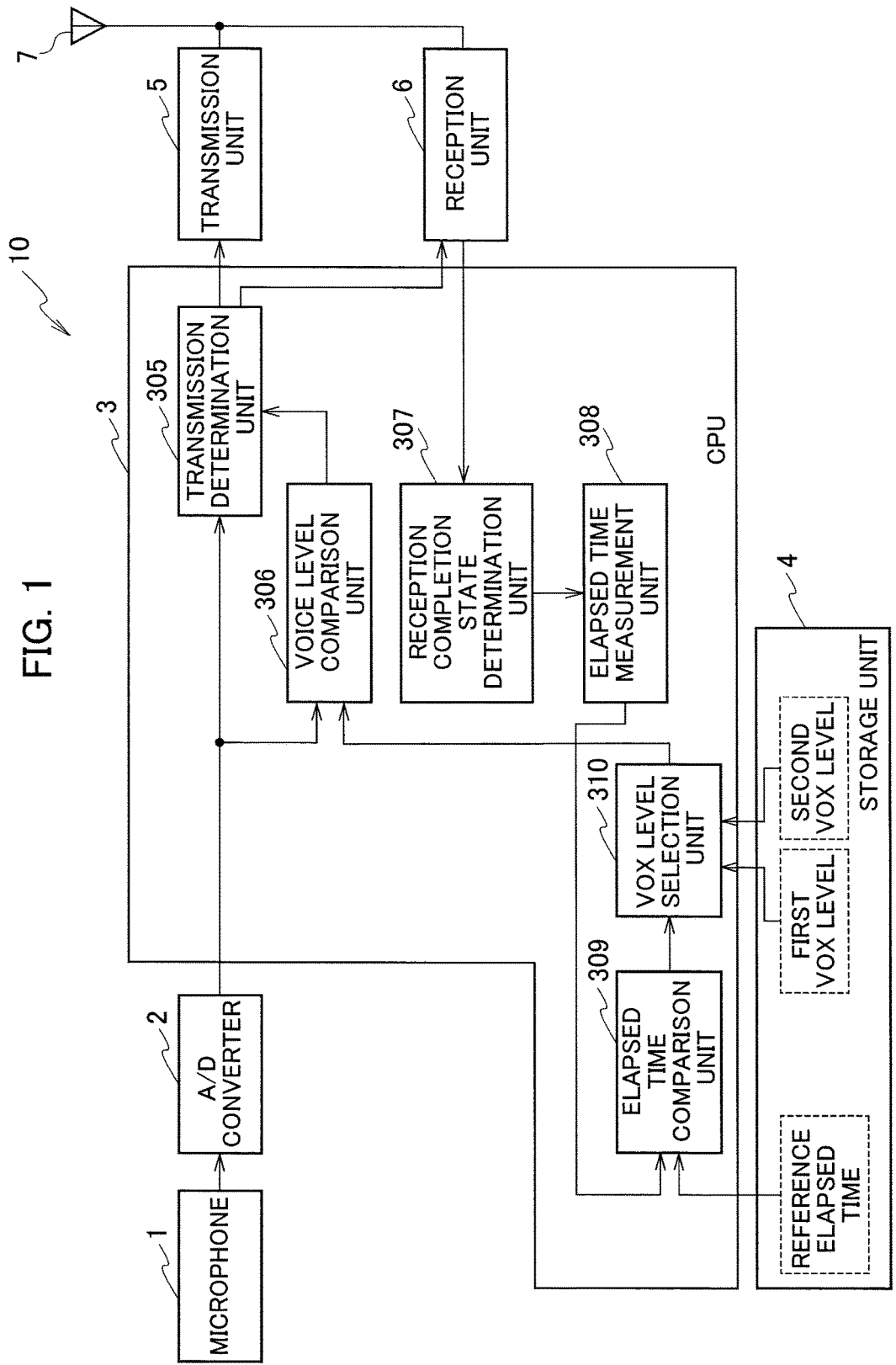
FIG. 1 is a block diagram showing a radio communication device according to Embodiment 1.

Hereinafter, a description will be given of a radio communication device 10 according to Embodiment 1 with reference to the accompanying drawings. As shown in FIG. 1, the radio communication device 10 includes a microphone 1, an A/D converter 2, a central processing unit (hereinafter, CPU) 3, a storage unit 4, a transmission unit 5, a reception unit 6, and an antenna 7 for transmission and reception. The storage unit 4 is a nonvolatile memory, and for example, is an Electrically Erasable and Programmable Read-only Memory (EEPROM). In FIG. 1, a PTT switch is not shown.

The microphone 1 collects a voice emitted by a user, and supplies an analog voice signal to the A/D converter 2. The A/D converter 2 converts the analog voice signal into a digital voice signal (A/D conversion), and supplies the digital voice signal to the CPU 3.

The CPU 3 includes a transmission determination unit 305, a voice level comparison unit 306, a reception completion state determination unit 307, an elapsed time measurement unit 308, an elapsed time comparison unit 309, and a VOX level selection unit 310.

The respective units from the transmission determination unit 305 to the VOX level selection unit 310 are composed as functions by software executed by the CPU 3; however, the respective units from the transmission determination unit 305 to the VOX level selection unit 310 may be composed of hardware. Choice of the hardware and the software is arbitrary.

The reception completion state determination unit 307 determines whether or not reception in the reception unit 6 is completed. Upon determining that the reception is completed, the reception completion state determination unit 307 supplies reception completion information to the elapsed time measurement unit 308. Moreover, while a reception signal from the antenna 7 continues to enter the reception unit 6, the reception completion state determination unit 307 determines that the reception signal continues and the reception is not completed.

The elapsed time measurement unit 308 measures an elapsed time since the reception is completed. Information indicating the elapsed time since the reception is completed, the elapsed time having been measured by the elapsed time measurement unit 308, is supplied to the elapsed time comparison unit 309. The storage unit 4 stores a reference elapsed time, a first VOX level and a second VOX level, the elapsed time comparison unit 309 compares the elapsed time since the reception is completed, the elapsed time having been measured by the elapsed time measurement unit 308, with the reference elapsed time.

That is, the elapsed time measurement unit 308 that measures the elapsed time since the reception is completed and the elapsed time comparison unit 309 that compares the elapsed time since the reception is completed, the elapsed time having been measured by the elapsed time measurement unit 308, with the reference elapsed time stored in the storage unit 4 compose a timer that starts to operate after the reception is completed and measures the reference elapsed time.

A comparison result by the elapsed time comparison unit 309 is supplied to the VOX level selection unit 310. The VOX level selection unit 310 selects the first VOX level when the measured elapsed time since the reception is completed exceeds the reference elapsed time, and selects the second VOX level when the measured elapsed time since the reception is completed stays within the reference elapsed time. Note that it is possible to arbitrarily set the reference elapsed time, the first VOX level and the second VOX level, which are stored in the storage unit 4.

The first VOX level and the second VOX level have a relationship of: first VOX level>second VOX level. That is, if the radio communication device 10 determines whether or not a voice collected by the microphone 1 is at a predetermined level or more with the second VOX level taken as a reference, then the VOX function will be activated at a relatively small volume. If the radio communication device 10 determines whether or not the voice collected by the microphone 1 is at a predetermined level or more with the first VOX level taken as a reference, then the VOX function will be activated at a volume larger than in the case of taking the second VOX level as a reference.

In other words, VOX sensitivity is higher in the case of setting the second VOX level than in the case of setting the first VOX level.

The first VOX level or the second VOX level, which is selected by the VOX level selection unit 310, is supplied to the voice level comparison unit 306. The voice level comparison unit 306 compares a level of the digital voice signal, which is output by the A/D converter 2, with the VOX level (either one of the first VOX level and the second VOX level) supplied from the VOX level selection unit 310. The voice level comparison unit 306 supplies a result of the comparison to the transmission determination unit 305.

If the level of the digital voice signal output from the A/D converter 2 is equal to or larger than the VOX level supplied from the VOX level selection unit 310 based on the result of the comparison, the transmission determination unit 305 supplies the digital voice signal to the transmission unit 5, and instructs the transmission unit 5 to transmit the digital voice signal. The transmission unit 5 encodes and modulates the voice signal, and transmits the encoded and modulated voice signal from the antenna 7. Moreover, the transmission determination unit 305 instructs the reception unit 6 to stop an operation of the reception at the time of instructing the transmission unit 5 to transmit the digital voice signal.

The fact that the level of the digital voice signal output from the A/D converter 2 is not equal to or larger than the VOX level supplied from the VOX level selection unit 310 means that the user does not emit a voice. In this case, the transmission determination unit 305 does not instruct the transmission unit 5 to transmit the voice signal.

The second VOX level is selected if the measured elapsed time since the reception is completed stays within the reference elapsed time. Therefore, the user does not need to start a call intentionally at a high volume, and can start a call at a normal volume. Hence, the user does not need to talk at an unnaturally high volume when starting a call soon after the reception from a communication partner is ended, and is enabled to make a natural conversation with the communication partner.

The fact that the elapsed time since the reception is ended exceeds the reference elapsed time indicates a state in which the conversation with the communication partner is temporarily ended. The first VOX level is selected at this time. Accordingly, the user talks at a large volume intentionally when intending to resume the call, thereby activating the VOX function to make it possible to resume the call.

Note that, when the radio communication device 10 always uses the second VOX level, the VOX function is activated at a relatively low volume, and a malfunction may possibly occur. Hence, it is not preferable to always use the second VOX level. A time of using the second VOX level is limited to the reference elapsed time of the elapsed time since the reception is completed. In this way, the user can make such a natural conversation with the communication partner while preventing an occurrence of the malfunction.

Figure 2:
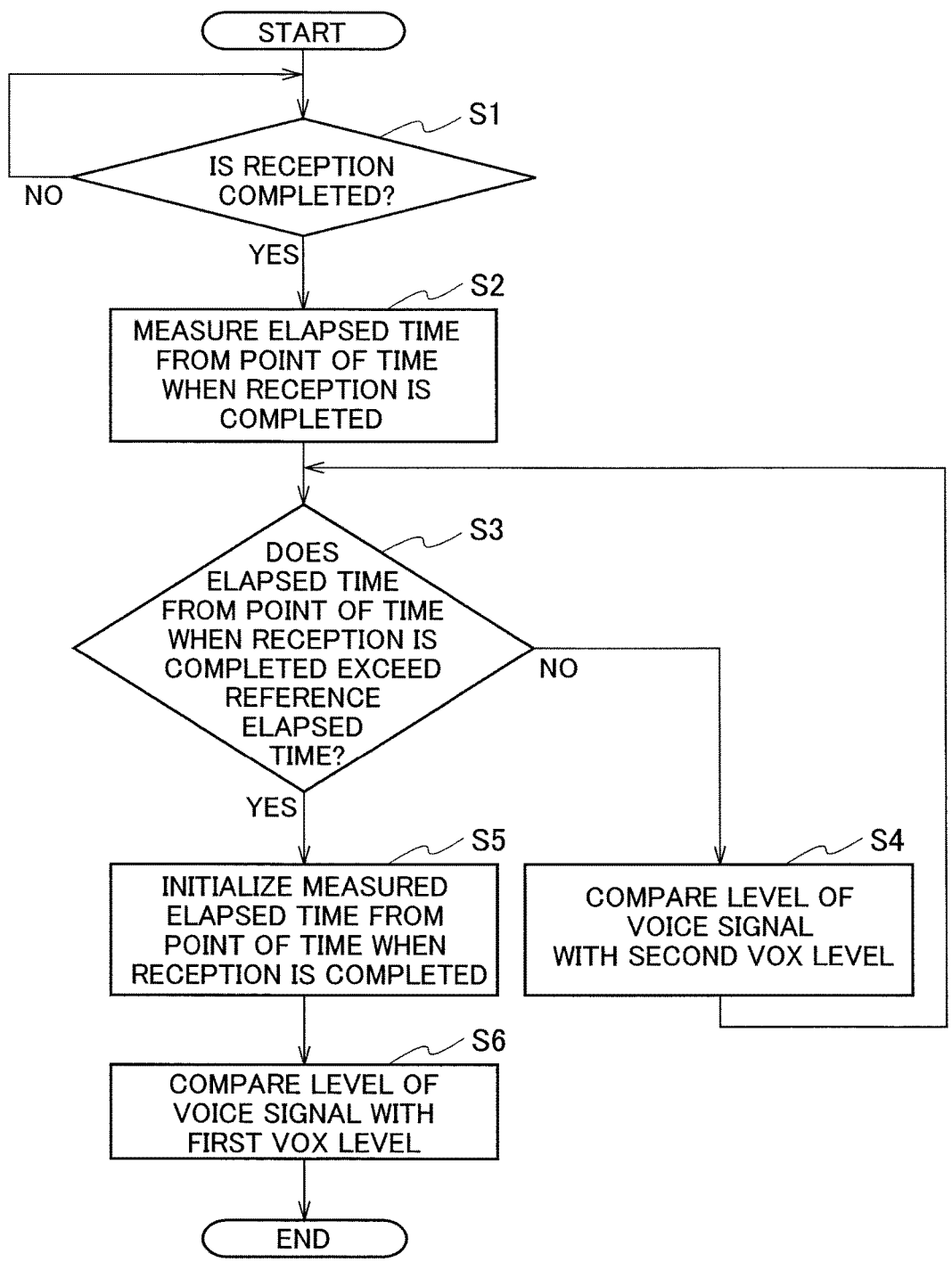
FIG. 2 is a flowchart showing operations of the radio communication device according to Embodiment 1.

By using a flowchart shown in FIG. 2, a description will be given of switching processing for the VOX level in the radio communication device 10 according to Embodiment 1. In FIG. 2, while the radio communication device is under reception, then in step S1, the CPU 3 determines whether or not the reception is completed. If the reception is not completed (NO), then the CPU 3 repeats processing of step S1. If the reception is completed in step S1 (YES), then in step S2, the CPU 3 starts to measure an elapse of time from a point of time when the reception is completed.

In step S3, the CPU 3 determines whether or not the elapsed time from the point of time when the reception is completed exceeds a reference time. If the CPU 3 determines in step S3 that the elapsed time from the point of time when the reception is completed exceeds the reference time (YES), then in step S5, the CPU 3 initializes the measured elapsed time from the point of time when the reception is completed, and in step S6, compares the level of the digital voice signal and the first VOX level with each other, and ends the processing. If the CPU 3 determines in step S3 that the elapsed time from the point of time when the reception is completed does not exceed the reference time (NO), then in step S4, the CPU 3 compares the level of the digital voice signal and the second VOX level with each other.

Embodiment 2

Figure 3:
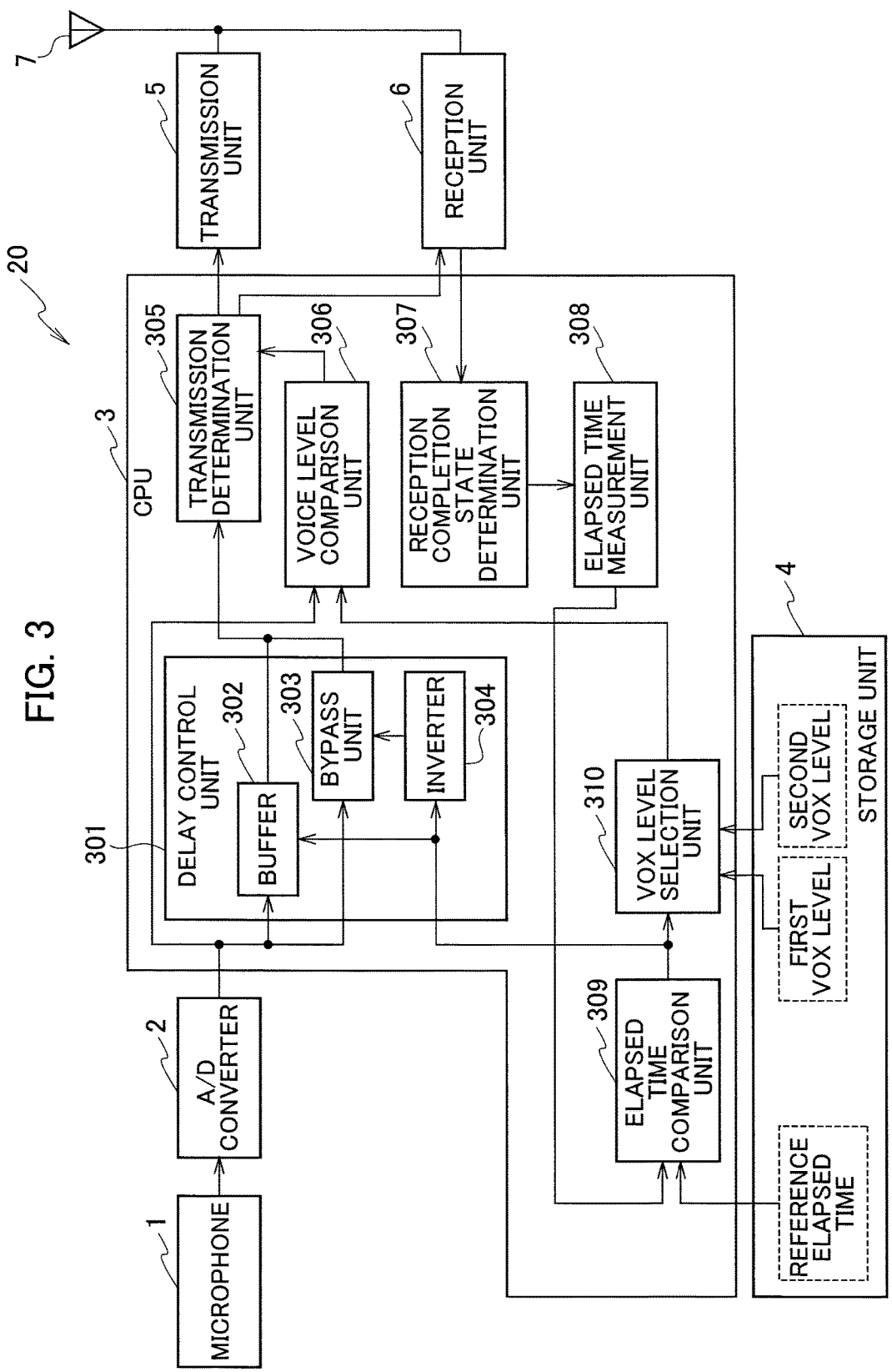
FIG. 3 is a block diagram showing a radio communication device according to Embodiment 2.

Hereinafter, a description will be given of a radio communication device 20 according to Embodiment 2 with reference to the accompanying drawings. As shown in FIG. 3, the radio communication device 20 has a configuration in which a delay control unit 301 is added to the radio communication device 10. The delay control unit 301 includes a buffer 302, a bypass unit 303, and an inverter 304.

The buffer 302 records a voice signal for a predetermined time in a First-In First-Out (FIFO) method, starts to reproduce a portion which is recorded earlier at a point of time when the recording reaches a set recording time and continues the recording by means of a recording region space made by the start of the reproduction, thereby delaying the digital voice signal.

The buffer 302 delays the digital voice signal input from the A/D converter 2, and supplies the delayed digital voice signal to the transmission determination unit 305. If it is determined that the elapsed time since the reception is completed stays within the reference elapsed time based on the comparison result from the elapsed time comparison unit 309, then the buffer 302 performs delay processing carried out by the recording and the reproduction. If the elapsed time since the reception is completed exceeds the reference elapsed time based on the comparison result from the elapsed time comparison unit 309, then the buffer 302 does not perform the delay processing carried out by the recording and the reproduction. Note that a length of time while the recording is possible may be arbitrarily settable by the user using the radio communication device 20.

The bypass unit 303 supplies the digital voice signal, which is input from the A/D converter 2 to the transmission determination unit 305 without delaying the digital voice signal concerned. If it is determined that the elapsed time since the reception is completed stays within the reference elapsed time based on the comparison result, which is sent from the elapsed time comparison unit 309 and is input via the inverter 304, then the bypass unit 303 does not pass the digital voice signal therethrough. If it is determined that the elapsed time since the reception is completed exceeds the reference elapsed time based on the comparison result sent from the elapsed time comparison unit 309, then the bypass unit 303 passes the digital voice signal therethrough.

In order to exclusively switch the buffer 302 and the bypass unit 303, the inverter 304 inverts a logic of the comparison result sent from the elapsed time comparison unit 309, and inputs such an inverted logic signal to the bypass unit 303.

In a case of the radio communication device 20 according to Embodiment 2, if the comparison result of the elapsed time comparison unit 309 indicates that the elapsed time since the reception is completed stays within the reference elapsed time, then the buffer 302 operates, and the inverter 304 stops the operation of the bypass unit 303. Moreover, when the comparison result of the elapsed time comparison unit 309 indicates that the elapsed time since the reception is completed exceeds the reference elapsed time, then the buffer 302 stops operating, and the bypass unit 303 operates. In place of the bypass unit 303, a switch that turs on/off according to an instruction from the inverter 304 may be provided.

With the above configuration, the delay control unit 301 performs the following operations. With regard to the digital voice signal output from the A/D converter 2, if the elapsed time since the reception is completed stays within the reference elapsed time, then the delay control unit 301 delays the digital voice signal by a predetermined time, and supplies the delayed digital voice signal to the transmission determination unit 305. Meanwhile, if the elapsed time since the reception is completed exceeds the reference elapsed time, then the delay control unit 301 supplies the digital voice signal to the transmission determination unit 305 without delaying the digital voice signal concerned.

With the above configuration, in the radio communication device 20 according to Embodiment 2, when the elapsed time since the reception is completed stays within the reference elapsed time, a digital voice signal delayed from the point of time when the level of the digital voice signal is detected to be equal to or more than the VOX level is input to the transmission determination unit 305, and the delayed digital voice signal is supplied to the transmission unit 5 for transmission. Moreover, in the radio communication device 20 according to Embodiment 2, when the elapsed time since the reception is completed exceeds the reference elapsed time, the digital voice signal is input to the transmission determination unit 305 from the point of time when the level of the digital voice signal is detected to be equal to or more than the VOX level, and the digital voice signal is supplied to the transmission unit 5 for transmission.

In the transmission of the voice by the VOX function, during a period from when the voice is input to the microphone 1 until when the level of the voice reaches the VOX sensitivity, and further, during a period from when the instruction to start the transmission is issued until the transmission unit 5 operates, the voice input to the microphone 1 is not transmitted, and recording latency occurs. Therefore, such a voice signal before the level of the voice input to the microphone 1 reaches the VOX sensitivity is recorded for a time sufficient for the time until the transmission unit operates, and the voice signal started to be reproduced after the transmission unit 5 operates is transmitted. In this way, the recording latency at the beginning of the call can be substantially eliminated.

Moreover, in the case of a radio communication device such as a portable radio communication device which operates with batteries, the batteries are consumed to a large extent if the radio communication device is always kept in a recording state during the reception. Accordingly, the recording operation is performed only when a call is started soon after the reception from the communication partner is ended, whereby a natural conversation with the communication partner is enabled without recording latency. When the conversation with the communication partner is temporarily ended, the recording is stopped, thus making it possible to reduce power consumption.

Figure 4:
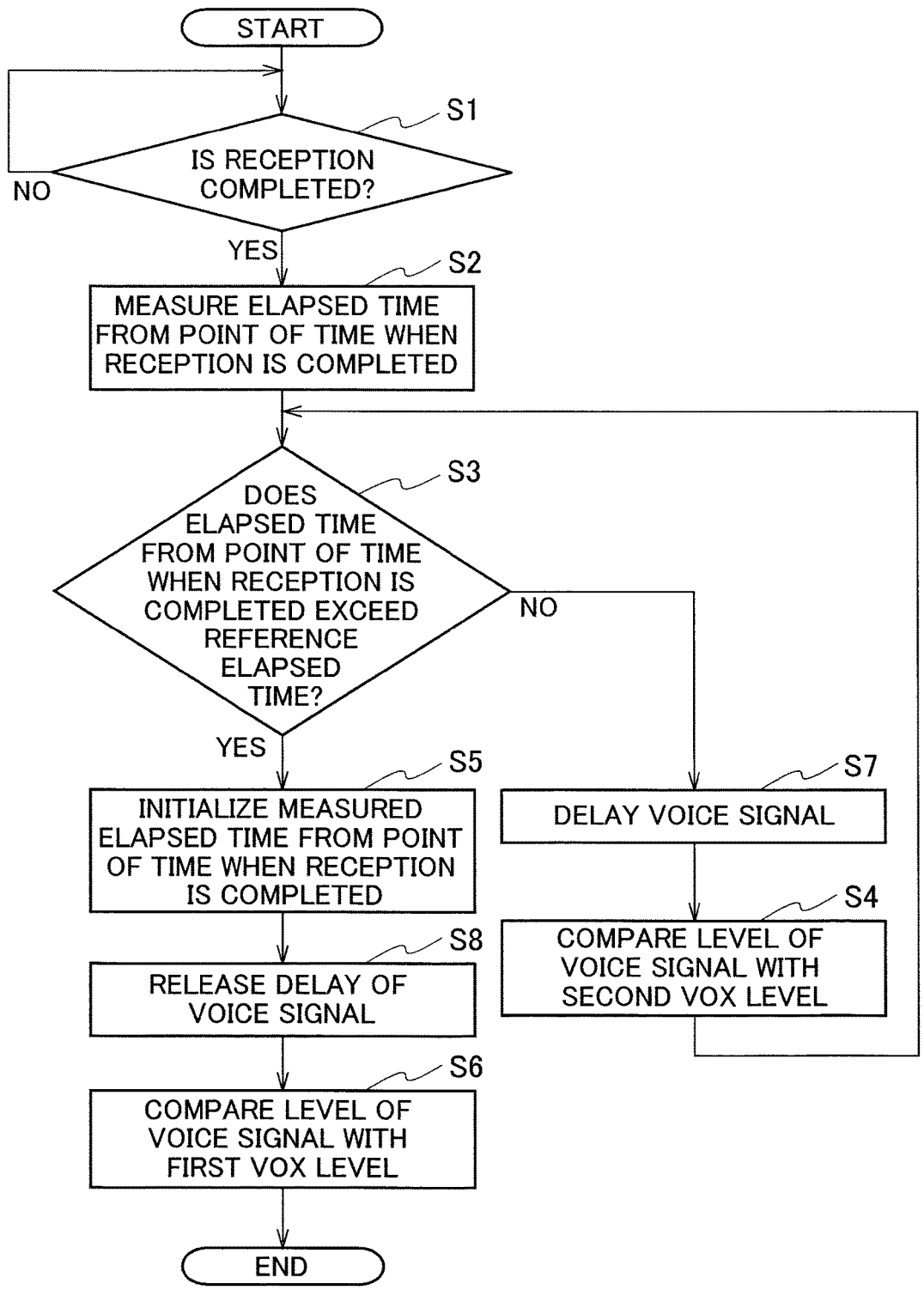
FIG. 4 is a flowchart showing operations of the radio communication device according to Embodiment 2.

By using a flowchart shown in FIG. 4, a description will be given of switching processing for the VOX level and delay processing for the voice signal in the radio communication device 20 according to Embodiment 2. Note that, since processing up to step S3 is the same as that of Embodiment 1, a description thereof will be omitted.

If the CPU 3 determines in step S3 that the elapsed time from the point of time when the reception is completed does not exceed the reference elapsed time (NO), then in step S7, the CPU 3 delays the voice signal from the microphone 1, and in step S4, compares the voice signal from the microphone 1 with the second VOX level. Then, the CPU 3 returns the processing to step S3.

If the CPU 3 determines in step S3 that the elapsed time from the point of time when the reception is completed exceeds the reference elapsed time (YES), then in step S5, the CPU 3 initializes the elapsed time from the measured point of time when the reception is completed, and in step S8, releases the delay of the voice signal output from the microphone 1. In step S6, the CPU 3 compares the level of the digital voice signal and the first VOX level with each other, and ends the processing.

In the radio communication device 10 according to Embodiment 1, in each of step S4 and step S6, if the level of the digital voice signal is equal to or more than the VOX level as a result of the comparison by the VOX level in each thereof, then the CPU 3 issues an instruction to start the transmission of the digital voice signal from that point of time.

In the radio communication device 20 according to Embodiment 2, in step S6, if the level of the digital voice signal is equal to or more than the VOX level, then the CPU 3 issues an instruction to start the transmission of the digital voice signal from that point of time. However, in the radio communication device 20 according to Embodiment 2, in step S4, if the level of the digital voice signal is equal to or more than the VOX level, then the CPU 3 issues an instruction to start the transmission of the digital voice signal delayed by the buffer 302 of the delay control unit 301.

As described above, in accordance with the radio communication device 10 according to Embodiment 1 and the radio communication device 20 according to Embodiment 2, it is not necessary to be conscious of the voice level at which the VOX function is activated, and the call can be started at a normal volume when the conversation with the communication partner continues. In accordance with the radio communication device of this embodiment, recording latency at the beginning of the call can be substantially eliminated.

The present invention is not limited to the configuration of the above-described Embodiments 1 and 2, and various modifications can be made without departing from the scope of the invention.

What is claimed is:

1. A radio communication device provided with a VOX function, comprising:
   a reception completion state determination unit configured to determine whether or not a reception unit of the radio communication device is in a state of completing reception;
   a timer configured to start to measure a predetermined time when the reception completion state determination unit determines that the reception unit is in the state of completing the reception; and
   a VOX level selection unit configured to set a VOX level at which the VOX function determines that transmission is made to a first VOX level after the timer finishes measuring the predetermined time, and to set the VOX level to a second VOX level smaller than the first VOX level while the timer is measuring the predetermined time.

2. The radio communication device according to claim 1, further comprising a delay control unit configured to delay a voice signal collected by a microphone by the predetermined time, wherein
   the radio communication device transmits the voice signal when the voice signal collected by the microphone exceeds the VOX level while the timer is measuring the predetermined time, the voice signal being delayed by the delay control unit and output.

3. The radio communication device according to claim 2, wherein
   the delay control unit comprises:
   a buffer configured to delay and output the voice signal collected by the microphone by recording and reproducing the voice signal for a predetermined time; and
   a bypass unit configured to output the voice signal collected by the microphone without delaying the voice signal,
   and wherein the radio communication device transmits the voice signal output from the buffer while the timer is measuring the predetermined time, and transmits the voice signal output from the bypass unit after the timer finishes measuring the predetermined time.

4. The radio communication device according to claim 3, wherein the delay control unit stops a function of the buffer after the timer finishes measuring the predetermined time.

\* \* \* \* \*